(12) United States Patent
Wollaeger et al.

(10) Patent No.: US 10,384,854 B2
(45) Date of Patent: Aug. 20, 2019

(54) PACKAGING SHEET FOR ELEVATED-TEMPERATURE USE

(71) Applicant: Bemis Company, Inc., Neenah, WI (US)

(72) Inventors: Corey A. Wollaeger, Appleton, WI (US); Ryan M. Wilks, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 99 days.

(21) Appl. No.: 15/635,606

(22) Filed: Jun. 28, 2017

(65) Prior Publication Data

US 2019/0002181 A1     Jan. 3, 2019

(51) Int. Cl.

| | | |
|---|---|---|
| *B65D 81/34* | (2006.01) | |
| *B32B 27/36* | (2006.01) | |
| *B32B 27/08* | (2006.01) | |
| *A23L 5/10* | (2016.01) | |
| *A47J 27/00* | (2006.01) | |
| *B65B 25/22* | (2006.01) | |
| *B65D 1/34* | (2006.01) | |

(Continued)

(52) U.S. Cl.
CPC ............ *B65D 81/3453* (2013.01); *A23L 5/15* (2016.08); *A47J 27/002* (2013.01); *A47J 36/027* (2013.01); *B32B 27/08* (2013.01); *B32B 27/36* (2013.01); *B65B 25/22* (2013.01); *B65D 1/34* (2013.01); *B65D 77/20* (2013.01); *A23V 2002/00* (2013.01); *B32B 2307/306* (2013.01); *B32B 2367/00* (2013.01); *B32B 2439/02* (2013.01)

(58) Field of Classification Search
CPC ...... B65D 81/3453; B65D 1/34; B65D 77/20; B32B 27/36; B32B 27/08; B32B 2307/306; B32B 2367/00; B32B 2439/02; A23L 5/15; A47J 27/002; A47J 36/027; B65B 25/22; A23V 2002/00
See application file for complete search history.

(56) References Cited

U.S. PATENT DOCUMENTS

| | | |
|---|---|---|
| 4,801,017 A | 1/1989 | Artusi |
| 4,847,129 A | 7/1989 | Collette et al. |
| 4,873,137 A | 10/1989 | Deyrup |

(Continued)

FOREIGN PATENT DOCUMENTS

| | | |
|---|---|---|
| CA | 2935643 A1 | 9/2016 |
| EP | 0437082 A1 | 7/1991 |

(Continued)

OTHER PUBLICATIONS

DuPont Teijin Films, A guide to Mylar® polyester films, Heat Sealable Range, 2005.

*Primary Examiner* — Michael C Miggins
(74) *Attorney, Agent, or Firm* — Christine E. Parsons (57) ABSTRACT

A packaging sheet is described. The sheet comprises a first layer comprising a first copolyester having a glass transition temperature of from 70° C. to 90° C. and an intrinsic viscosity of from 0.70 dl/g to 0.90 dl/g. The first copolyester comprises from 50% to 85% by volume of the sheet. The sheet also comprises a second layer comprising a second copolyester having a glass transition temperature of equal to or greater than 112° C. The second copolyester comprises from 15% to 50% by volume of the sheet. The sheet is thermally stable after exposure to temperatures up to 112° C. Various embodiments of the sheet are also described.

20 Claims, 7 Drawing Sheets

(51) Int. Cl.
    *B65D 77/20*    (2006.01)
    *A47J 36/02*    (2006.01)

(56)        References Cited

U.S. PATENT DOCUMENTS 6,467,647 B1    10/2002    Tucker et al.
    7,019,271 B2     3/2006    Wnek et al.
    7,211,306 B2     5/2007    Peiffer et al.
    7,748,561 B2     7/2010    Varriano-Marston et al.
    7,906,610 B2     3/2011    Crawford et al.
    9,598,533 B2     3/2017    Crawford et al.
 2005/0100729 A1     5/2005    Peiffer et al.
 2008/0293857 A1    11/2008    Crawford et al.
 2010/0221391 A1     9/2010    Deng et al.
 2015/0140300 A1     5/2015    Pudleiner et al.

FOREIGN PATENT DOCUMENTS

PACKAGING SHEET FOR ELEVATED-TEMPERATURE USE

The present application describes a packaging sheet for elevated-temperature use. More specifically, the present application describes a sheet having a first layer comprising a first copolyester and a second layer comprising a second copolyester.

BACKGROUND

Packaging sheets in rigid and semi-rigid formats may be used for a variety of applications, ranging from fresh foods to medical devices. Certain applications include the use of the packaging at elevated temperatures. Examples of these applications include but are not limited to hot-filled food items and sterilization or cooking via steaming in a microwave oven, in these applications, the packaging materials may experience temperatures of from 70° C. to 100° C. or greater. For many of these applications, it is critical that the packaging sheet does not deform or lose considerable strength at the elevated temperatures.

Crystallized polyester (CPET) trays are commonly used for packaging that is subjected to high temperatures. These materials can withstand extreme temperatures, including oven cooking. CPET trays are typically used for frozen meals that can be reheated in a microwave oven or conventional oven. Due to the high levels of crystallinity in these materials, the thermoformed parts do not deform at elevated temperatures. However, CPET-based packaging material's are completely opaque, making it impossible to see the product contained in the package.

Polypropylene materials are also commonly used in packaging subjected to high temperatures. Retort processing (high temperature and pressure pasteurization completed after product is in the packaging) in polymeric packaging often uses polypropylene sealants because of their high heat resistance. Polypropylene materials may be chosen to optimize clarity. However, polypropylene can be difficult to thermoform, making it less attractive for rigid or semi-rigid applications.

Packaging sheets that use one amorphous polyester material solve many of the issues presented by CPET or polypropylene. An amorphous polyester can be processed to limit the crystallinity and to maintain high levels of clarity and low levels of haze for the packaging material. In addition, these materials thermoform easily (with fast cycle times, wide operating window, etc.). However, a sheet with one amorphous polyester packaging material typically does not have enough temperature resistance to hold its shape at elevated temperatures.

SUMMARY

What is needed is a relatively transparent, non-opaque material that is easy to thermoform and that has enough temperature resistance to hold its shape at elevated temperatures. These needs are met by the sheet described in the present application. This sheet provides exceptional clarity and excellent thermoforming capabilities with the addition of unexpectedly low deformation at elevated temperatures.

In a first set of embodiments, this sheet comprises a first layer comprising a first copolyester having a glass transition temperature of from 70° C. to 90° C. and an intrinsic viscosity of from 0.70 dl/g to 0.90 dl/g and a second layer comprising a second copolyester having a glass transition temperature of equal to or greater than 112° C. In some embodiments, the first copolyester comprises APET. In some embodiments, the second copolyester has a glass transition temperature of from 112° C. to 250° C. The first copolyester comprises from 50% to 85% by volume of the sheet, and the second copolyester comprises from 15% to 50% by volume of the sheet. In other embodiments, the first copolyester comprises from 60% to 85% by volume of the sheet and the second copolyester comprises from 15% to 40% by volume of the sheet. In yet other embodiments, the first copolyester comprises from 70% to 85% by volume of the sheet and the second copolyester comprises from 15% to 30% by volume of the sheet. The sheet is thermally stable after exposure to temperatures up to 112° C.

In some embodiments of the first set of embodiments, the sheet further comprises a third layer also comprising the first copolyester such that the second layer is positioned between the first layer and the third layer. In some of these embodiments, the first layer and the third layer have a substantially similar thickness.

In some embodiments of the first set of embodiments, the sheet has a clarity after exposure to temperatures up to 112° C. that is substantially similar to a clarity before exposure to temperatures up to 112° C. In some embodiments, the sheet has a haze after exposure to temperatures up to 112° C. that is substantially less than a haze after exposure to temperatures up to 112° C. over a similar time period of another sheet having a similar thickness and comprising the first copolyester but not comprising the second copolyester. In some embodiments, the sheet has a stress at yield after exposure to temperatures up to 112° C. that is substantially greater than a stress at yield after exposure to temperatures up to 112° C. of another sheet having a similar thickness and comprising the first copolyester but not comprising the second copolyester. And in some embodiments, the sheet has a thickness of from 10 mil to 50 mil.

In some embodiments of the first set of embodiments, the sheet is thermoformable or the sheet is thermoformed into a package.

In a second set of embodiments, a tray comprises a thermoformed sheet comprising a first layer comprising a first copolyester having a glass transition temperature of from 70° C. to 90° C. and an intrinsic viscosity of from 0.70 dl/g to 0.90 dl/g and a second copolyester having a glass transition temperature of from 112° C. to 250° C. The first copolyester comprises from 70% to 85% by volume of the sheet, and the second copolyester comprises from 15% to 30% by volume of the sheet. The sheet further comprises a third layer also comprising the first copolyester. The second layer is positioned between the first layer and the third layer, and the first layer and the third layer have a substantially similar thickness. The sheet is thermally stable after exposure to temperatures up to 112° C.

In some embodiments of the second set of embodiments, the sheet has a thickness of from 20 mil to 40 mil. In some embodiments, the sheet has a haze after exposure to temperatures up to 112° C. that is substantially less than a haze after exposure to temperatures up to 112° C. over a similar time period of another sheet having a similar thickness and comprising the first copolyester but not comprising the second copolyester.

In some embodiments of the second set of embodiments, the tray is adapted to package a food product. In some of these embodiments, the food product comprises produce.

In a third set of embodiments, a method of cooking produce comprises providing a tray comprising a thermoformed sheet comprising (a) a first layer comprising a first copolyester having glass transition temperature of from 70°

C. to 90° C. and an intrinsic viscosity of from 0.70 dl/g to 0.90 dl/g (b) a second layer comprising a second copolyester having a glass transition temperature of equal to or greater than 112° C., and (c) a third layer also comprising the first copolyester. The second layer is positioned between the first layer and the third layer, and the first layer and the third layer have a substantially similar thickness. The first copolyester comprises from 70% to 85% by volume of the sheet, and the second copolyester comprises from 15% to 30% by volume of the sheet. The method further comprises filling the tray with produce and heating the filled tray in a microwave oven. The tray is thermally stable after exposure to microwave heating.

In some embodiments of the third set of embodiments, the sheet has a haze after exposure to microwave heating that is substantially less than a haze after exposure to microwave heating over a similar time period of another sheet having a similar thickness and comprising the first copolyester but not comprising the second copolyester.

DETAILED DESCRIPTION

Figure 1:
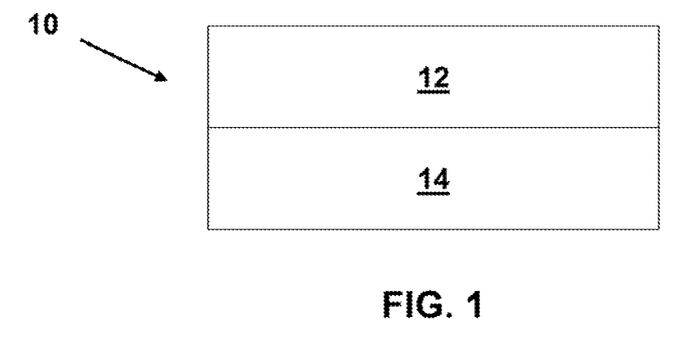
FIG. 1 is a schematic cross-sectional view of a first embodiment of a sheet according to the present application.

Referring to the drawings, with some but not all embodiments depicted, with elements depicted as illustrative and not necessarily to scale, and with the same (or similar) reference numbers denoting the same (or similar) features throughout the drawings, FIG. 1 is a schematic cross-sectional view of a first embodiment of a thermoplastic sheet (or film) according to the present application. As used throughout this application, the term "film" refers to a thermoplastic web of any thickness and is not limited to a thermoplastic web having a thickness of less than 10 mil. The term "sheet" refers to a thermoplastic web of any thickness and is not limited to a thermoplastic web having a thickness of greater than 10 mil. As used throughout this application, the term "thermoplastic" refers to a polymer or polymer mixture that softens after exposure to heat and then returns to its original condition when cooled to room temperature.

As depicted in FIG. 1, sheet 10 comprises first layer 12 and second layer 14. First layer 12 comprises a first copolyester and second layer 14 comprises a second copolyester.

Polyesters are a class of polymers which have an ester linkage between monomer units. The ester linkage may be represented by the general formula [O—R—OC(O)—R'—C(O)]$_n$, where R and R' are the same or different alkyl (or aryl) groups and may generally be formed by the polymerization of diacids and dials. Homopolymer polyester is formed when the diacid is terephthalic acid (TPA) and the diol is ethylene glycol (EG). As used throughout this application, the term "copolyester" refers to a polyester that is polymerized using other diacids and dials instead of or in addition to TPA and EG. A commonly used diacid for copolyesters is isophthalic acid (IPA). Other diacids may be linear, aliphatic, aromatic, or alkyl substituted aromatic (such as IPA). Useful examples of dials used in copolyesters are diethylene glycol (DEG), cyclohexanedimethanol (CHDM), 2,2,4,4-tetramethyl-1,3-cyclobutanedial, and the like. Copolyesters useful for sheet or other packaging applications include but are not limited to amorphous polyester (APET) and polyethylene terephthalate glycol-modified (PETG).

As described in the present application, the first copolyester has a glass transition temperature of from 70° C. to 90° C. As used throughout this application, the term "glass transition temperature" or "T$_g$" refers to the temperature range over which a material transitions from a glassy state to a rubbery state (i.e., the temperature range over which a material "softens"). The glass transition temperature is, in actuality, a range. However, scientists have agreed to accept a single temperature as the indicator per certain standards, such as those associated with differential scanning calorimetry (DSC), thermomechanical analysis (TMA) and dynamic mechanical analysis (DMA). Glass transition temperature may be determined in accordance with ASTM D3418-15 ("Standard Test Method for Transition Temperatures and Enthalpies of Fusion and Crystallization of Polymers by Differential Scanning calorimetry").

The first copolyester also has an intrinsic viscosity of 0.70 dl/g to 0.90 dl/g. As used throughout this application, the term "intrinsic viscosity" refers to measure of the copolyester's molecular weight and therefore reflects the copolyester's melting point, crystallinity, and tensile strength. Intrinsic viscosity may be determined for the copolyester material itself (i.e., as a resin or pellet) or may be determined for the copolyester as a component in the sheet. As used throughout this application, the term "intrinsic viscosity" refers to the intrinsic viscosity of the copolyester in any form, i.e., as a resin/pellet or as a component in the sheet.

An example of a first copolyester includes but is not limited to polyethylene terephthalate (PET) which is processed (as a non-limiting example, via extrusion quench process) to be amorphous or semi-crystalline. Such processed PET includes but is not limited to APET or "bottle-grade" APET. Examples of "bottle-grade" APET (i.e., PET which may be processed to be amorphous or semi-crystalline and which is typically used n blow-molding bottles), each of which has a glass transition temperature of from 70° C. to 90° C. and an intrinsic viscosity of from 0.70 dl/g to 0.90 dl/g, include but are not limited to Laser+® C 9921 (F65A) (having a reported intrinsic viscosity of 0.80±0.02 dl/g, a reported glass transition temperature of 78.0° C., and a reported nominal melt point of 238° C.), Laser+® C (E60A) (having a reported intrinsic viscosity of 0.81±0.02 dl/g and a reported nominal melt point of 246° C.), and Laser+® GP 2400 (B12A) (having a reported intrinsic viscosity of 0.84±0.03 dl/g and a reported nominal melting point of 243° C.), each of which is available from DAK Americas LLC (Chadds Ford, Pa.); Cleartuf® 8006C (having a reported intrinsic viscosity of 0.80±0.02 dl/g and a reported melting point of 248.0° C.), which is available from M&G Polymers USA, LLC (Houston, Tex.); Preformance™ PET 1708 (having a reported intrinsic viscosity of 0.80±0.02 dl/g), which is available from StarPet Inc. USA (Asheboro, N.C.); Polyclear® Crystal PET 3302 (having a reported intrinsic viscosity of 0.79±0.02 dl/g and a reported melting point of 248° C. maximum), which is available from Invista S.àr.l. (Charlotte, N.C.); and PQB7-080 (having a reported intrinsic viscosity of 0.80±0.02 dl/g), which is available from PolyQuest, Incorporated (Wilmington, N.C.).

As described in the present application, the second copolyester has a glass transition temperature of equal to or greater than 112° C. In some embodiments, the second copolyester may have a glass transition temperature of from 112° C. to 250° C. (approximately the upper limit of the melting point of the first copolyester). Examples of a second copolyester include but are not limited to Tritan™ copolyesters, which are available from Eastman Chemical Company (Kingsport, Tenn.). Non-limiting examples of a Tritan™ copolyester include Eastman Tritan™ Copolyester FX200, which is an amorphous copolyester having a reported density of 1.19 g/cc and a reported glass transition temperature of 119° C. (DSC) and Eastman Tritan™ Copolyester MP200, which is an amorphous copolyester having a reported density of density of 1.19 g/cc and a reported glass transition temperature of 119° C. (DSC).

In some embodiments, the first copolyester comprises from 50% to 85% by volume of the sheet; in other embodiments, the first copolyester comprises from 60% to 85% by volume of the sheet; and in still other embodiments, the first copolyester comprises from 70% to 85% by volume of the sheet.

In some embodiments, the second copolyester comprises from 15% to 50% by volume of the sheet, in other embodiments, the second copolyester comprises from 15% to 40% by volume of the sheet; and in still other embodiments, the second copolyester comprises from 15% to 30% by volume of the sheet.

In some embodiments, the first copolyester comprises from 50% to 85% by volume of the sheet and the second copolyester comprises from 15% to 50% by volume of the sheet; in other embodiments, the first copolyester comprises from 60% to 85% by volume of the sheet and the second copolyester comprises from 15% to 40% by volume of the sheet; and in still other embodiments, the first copolyester comprises from 70% to 85% by volume of the sheet and the second copolyester comprises from 15% to 30% by volume of the sheet.

As described in the present application, the first copolyester volume percent in the sheet (i.e., by volume of the sheet) and the second copolyester volume percent in the sheet (i.e., % by volume of the sheet) are the percent of the sheet as a whole, not the percent of a particular layer. The first copolyester may be in one layer or more than one layer of the sheet, and the second copolyester may be in one layer or more than one layer of the sheet. For example, the first layer of the sheet described in the present application comprises the first copolyester, and another layer, such as an optional third layer, may also comprise the first copolyester. The percent by volume of the first copolyester in the sheet is the total contributed by each layer comprising the first copolyester, and the percent by volume of the second copolyester in the sheet is the total contributed by each layer comprising the second copolyester.

Returning to FIG. 1 sheet 10 comprising first layer 12 and second layer 14 is thermally stable after exposure to temperatures up to 112° C. As used throughout this application, the term "thermally stable" refers to an article capable of maintaining dimensionality and shape and not substantially distorting or deforming after exposure to temperatures up to 112° C. Temperatures up to 112° C. include but are not limited to temperatures of materials placed in or on the article (e.g., hot fill materials having temperatures of 68° C. to 80° C. or 71° C. to 110° C. or up to 112° C.) or temperatures in the environment surrounding the article (e.g., boiling water at 100° C. or steam sterilization or microwave heating or other heating) or temperatures experienced by the combination (e.g., the rising temperature of a material placed in or on the article as the filled article is heated by various methods).

Figure 2:
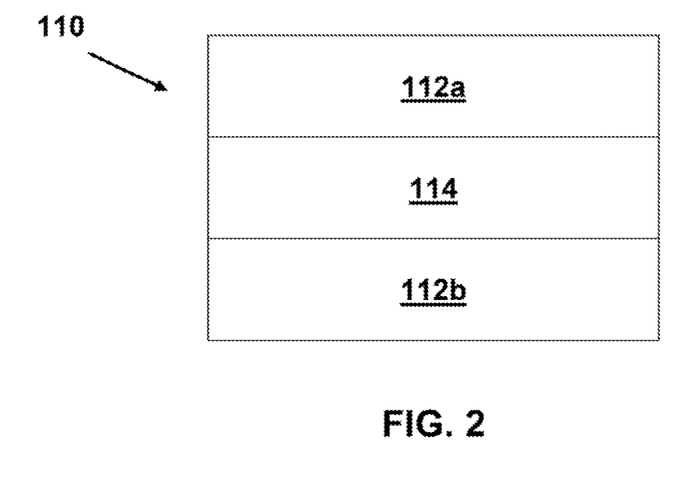
FIG. 2 is a schematic cross-sectional view of a second embodiment of a sheet according to the present application.

FIG. 2 is a schematic cross-sectional view of a second embodiment of a sheet according to the present application. Sheet 110 comprises first layer 112a, second layer 114, and third layer 112b. In this embodiment, first layer 112a and third layer 112b each comprises the first copolyester as described above. Second layer 114 comprises the second copolyester as described above. Second layer 114 is positioned between and directly adjacent (i.e., touching) each of first layer 112a and third layer 112b.

In some embodiments of sheet 110, first layer 112a and third layer 112b have a substantially similar thickness, and sheet 110 may be considered to be substantially symmetrical or palindromic in structure. (As used throughout this application, the term "substantially" refers to being for the most part, primarily, principally, predominantly, chiefly, mainly, mostly, or generally. A property that is "substantially" may or may not be completely, fully, perfectly, thoroughly, totally, or wholly.) In some non-limiting embodiments, sheet 110 may have an overall thickness of 22 mil. In such sheet, first layer 112a consisting of the first copolyester may have a thickness of 8.25 mil and third layer 112b also consisting of the first copolyester may also have a thickness of 8.25 mil; and, therefore, first layer 112a and third layer 112b have a substantially similar thickness. In such sheet, the first copolyester in first layer 112a comprises 37.5% by volume of the sheet, the first copolyester in third layer 112b comprises 37.5% by volume of the sheet, and the first copolyester in the sheet (as a whole) comprises 75% by volume of the sheet.

Figure 3:
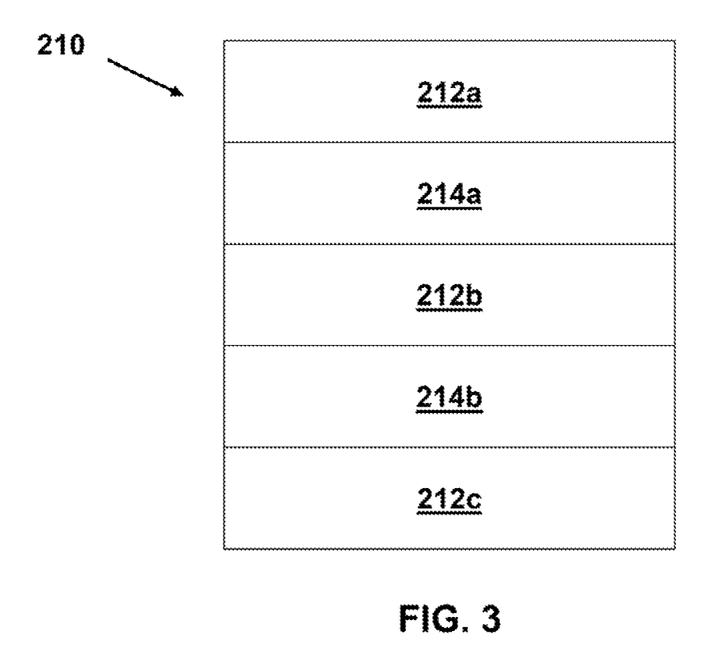
FIG. 3 is a schematic cross-sectional view of a third embodiment of a sheet according to the present application.

FIG. 3 is a schematic cross-sectional view of a third embodiment of a sheet according to the present application. Sheet 210 comprises first layer 212a, second layer 214a, third layer 212b, fourth layer 214b, and fifth layer 212c. In this embodiment, first layer 212a, third layer 212b, and fifth layer 212c each comprises the first copolyester as described above. Second layer 214a and fourth layer 214b each comprises the second copolyester as described above. Second layer 214a is positioned between and directly adjacent (i.e., touching) first layer 212a and third layer 212b. Third layer 212b is positioned between but not directly adjacent (i.e., not touching) each of first layer 212a and fifth layer 212c.

In some embodiments of sheet 210, first layer 212a and fifth layer 212c have a substantially similar first thickness and second layer 214a and fourth layer 214b have a substantially similar second thickness. In such embodiments, sheet 210 may be considered to be substantially symmetrical or palindromic in structure.

As is the first copolyester in sheet 110 in FIG. 2, the second copolyester in sheet 210 is also split, i.e., in more than one layer; and the percent by volume of the second copolyester in sheet 210 is the total of the second copolyester in second layer 214a and fourth layer 214b.

Figure 4:
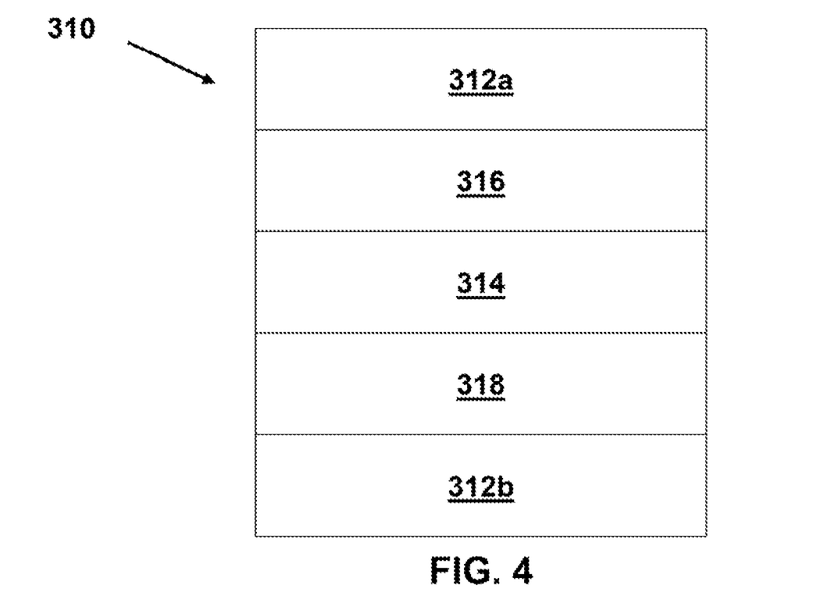
FIG. 4 is a schematic cross-sectional view of a fourth embodiment of a sheet according to the present application.

FIG. 4 is a schematic cross-sectional view of a fourth embodiment of a sheet according to the present application. Sheet 310 comprises first layer 312a, second layer 314, third layer 312b, first intermediate layer 316, and second intermediate layer 318. In this embodiment, first layer 312a and third layer 312b each comprises the first copolyester as described above. Second layer 314 comprises the second copolyester as described above. Second layer 314 is positioned between but not directly adjacent (i.e., not touching) first layer 312a and third layer 312b.

First intermediate layer 316 and second intermediate layer 318 may comprise tie material, barrier material, or other materials as known to a person of ordinary skill in the packaging arts. As used throughout this application, the term "tie material" or "tie" refers to a polymeric material serving a primary purpose or function of adhering two surfaces to one another, such as the planar surfaces of two sheet or film layers. For example, a tie material adheres one sheet layer surface to another sheet layer surface or one area of a sheet layer surface to another area of a sheet layer surface. Tie material may comprise any polymer, copolymer, or blend of polymers having a polar group or any other polymer, homopolymer, copolymer, or blend of polymers, including modified and unmodified polymers (such as grafted copolymers) which provide sufficient interlayer adhesion to adjacent layers comprising otherwise non-adhering polymers. In some embodiments, tie material may comprise but is not limited to peelable adhesive and permanent adhesive. In various embodiments, first intermediate layer 316 and second intermediate layer 318 may be monolayer or multilayer layer films.

Figure 5:
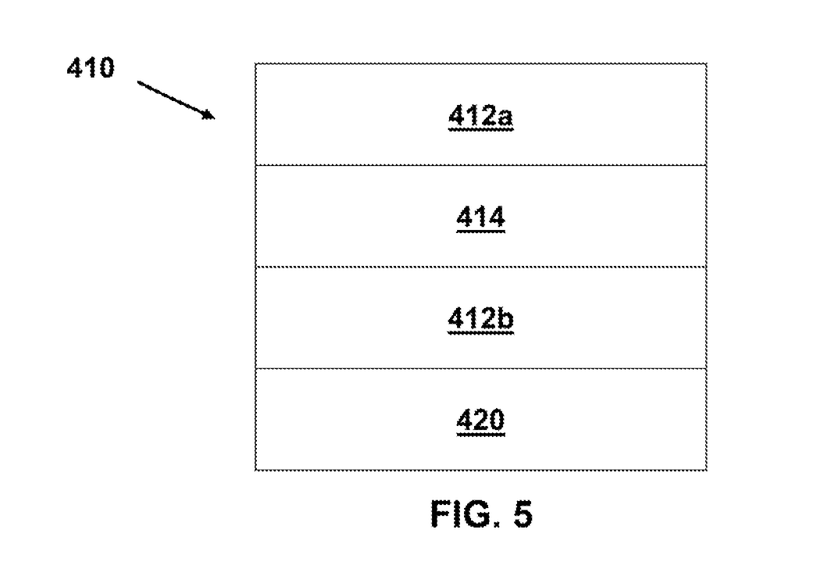
FIG. 5 is a schematic cross-sectional view of a fifth embodiment of a sheet according to the present application.

FIG. 5 is a schematic cross-sectional view of a fifth embodiment of a sheet according to the present application. Sheet 410 comprises first layer 412a, second layer 414, third layer 412b, and sealant film 420. In this embodiment, first layer 412a and third layer 412b each comprises the first copolyester as described above. Second layer 414 comprises the second copolyester as described above. Second layer 414 is positioned between and directly adjacent (i.e., touching) first layer 412a and third layer 412b.

Sealant film 420 is a film included in sheet 410 (or any other sheet of the various embodiments described in the present application) involved in the sealing of the sheet to itself or to another layer of another film, sheet, etc. Sealant film 420 may be monolayer or multilayer. Either as monolayer or multilayer layer, sealant film 420 comprises a sealant layer. The term "sealant layer" or "sealant layers" refers to the specific layer or layers of sealant film 420 involved in the sealing to itself or to another layer. Sealant film 420 may be a blown film sealant, an extrusion coated sealant, a heat seal lacquer or coating, or other sealant material known to a person of ordinary skill in the packaging arts. Sealant film 420 may be continuous or patterned.

As depicted in FIG. 5, sealant film 420 is positioned interior and first layer 412a is positioned exterior. As used throughout this application, the term "exterior" refers to a relative position closer to the outermost surface of a film, sheet, web, package or other article. The term "interior" refers to a relative position closer to the innermost surface of a film, sheet, web, package or other article. Accordingly, the term "exterior layer" refers to a layer comprising the outermost surface of a film, sheet, web, package, or other article, e.g., the layer to be most distant from package contents. The term "interior layer" refers to a layer comprising the innermost surface of a film, sheet, web, package, or other article, e.g., the layer to be most adjacent to package contents. Additionally, the exterior layer and the interior layer each have an inner surface and an outer surface. The term "inner surface" refers to a surface touching another layer, and the term "outer surface" refers to a surface not touching another layer. Correspondingly, the term "inner layer" refers to a layer having an inner surface on each surface and is distinct from an interior layer.

Various methods for making the sheet described in the present application exist. In some embodiments, the first layer and the second layer (and optional third or other layers) are created by flat-die cast co-extrusion. A sealant film may be cast co-extruded with such layers or may be adhesive laminated, thermal laminated, extrusion laminated, coated or otherwise added to the sheet after such layers are cast co-extruded. In other embodiments of the sheet, such as those in which the sheet has a lesser thickness (i.e., lower in the range of from 10 mil to 50 mil as described below), the sheet may be made by blown film co-extrusion.

The sheet described in the present application may be thermoformable. As used throughout this application, the term "thermoformable" refers to a sheet capable of being formed or thermoformed into a desired shape by the application of a differential pressure between the sheet and a mold, by the application of heat, by the combination of the application of heat and a differential pressure between the sheet and a mold, or by any thermoforming technique known to a person of ordinary skill in the packaging arts.

The sheet described in the present application may be thermoformed into a package. Thermoforming and other similar techniques are well known in the packaging arts. (See Throne, "Thermoforming," Encyclopedia of Polymer Science and Technology, Third Edition, 2003, Volume 8, pp. 222-251 (John Wiley & Sons, Inc., Hoboken, N.J.); see also Irwin, "Thermoforming," Modern Plastics Encyclopedia, 1984-1985, pp. 329-336 (McGraw-Hill, Inc., New York, N.Y.); see also "Thermoforming," The Wiley Encyclopedia of Packaging Technology, Second Edition, 1997, pp. 914-921 (John Wiley & Sons, Inc., New York, N.Y.).) Suitable thermoforming methods include standard, deep-draw, or plug-assist vacuum forming. During standard vacuum forming a thermoplastic web, such as the sheet described in the present application, is heated and a vacuum is applied beneath the web allowing atmospheric pressure to force the web into a preformed mold. When relatively deep molds are employed, the process is referred to as a "deep-draw" application. In a plug-assist vacuum forming method, after the thermoplastic web has been heated and sealed across a mold cavity, a plug shape similar to the mold shape impinges on the thermoplastic web and, upon the application of vacuum, the thermoplastic web conforms to the mold surface.

As used throughout this application, the term "package" refers to any article used to wholly or partially surround or contain an item. A package may take many, various forms. For example, the term "package" may include pouches that wholly surround or contain an item (or items) to be packaged. The term "package" may also include films, sheets, etc. that partially surround or contain an item (or items) to be packaged and, when used in conjunction with another film, sheet, etc. wholly surround or contain an item (or items). The term package may further include trays, cups, lidding materials, plates or other items.

Figure 6:
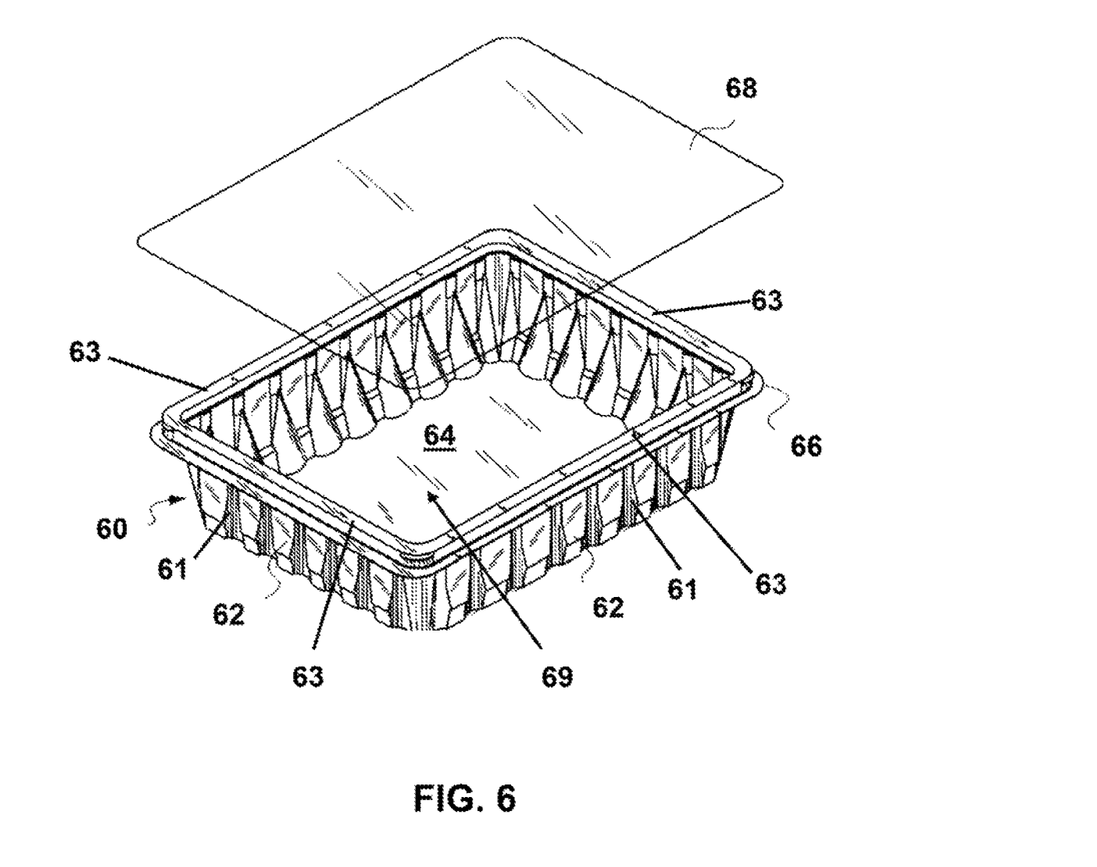
FIG. 6 is an exploded isometric view of a tray thermoformed from an embodiment of a sheet according to the present application and a lidding material also from an embodiment of a sheet according to the present application.

FIG. 6 is an exploded isometric view of a tray thermoformed from an embodiment of a sheet according to the present application and a lidding material also from an embodiment of a sheet according to the present application. Tray 60 comprises side walls 62, base wall 64, and tray flange 66. Tray flange 66 defines the outer periphery of tray 60. Lidding material 68 is a non-formed sheet from an embodiment of a sheet according to the present application and is adapted to attach (by various means known to a person of ordinary skill in the packaging arts) to side wall upper portions 63 or to tray flange 66 to completely enclose cavity 69 (or in some embodiments (not depicted) to partially enclose the cavity). As depicted in FIG. 6, side wall 62 of tray 60 comprises various ribs 61. In various embodiments, a tray thermoformed from a sheet according to the present application may or may not have various ribs or other ornamentation, openings or micro perforations (or other venting features), or other functional features. Additionally as depicted in FIG. 6, tray 60 is a rectangle. In various embodiments, a tray thermoformed from a sheet according to the present application may be rectangle, square, oval, circle, five-sided, six-sided, or otherwise as known to a person of skill in the packaging arts.

Figure 7:
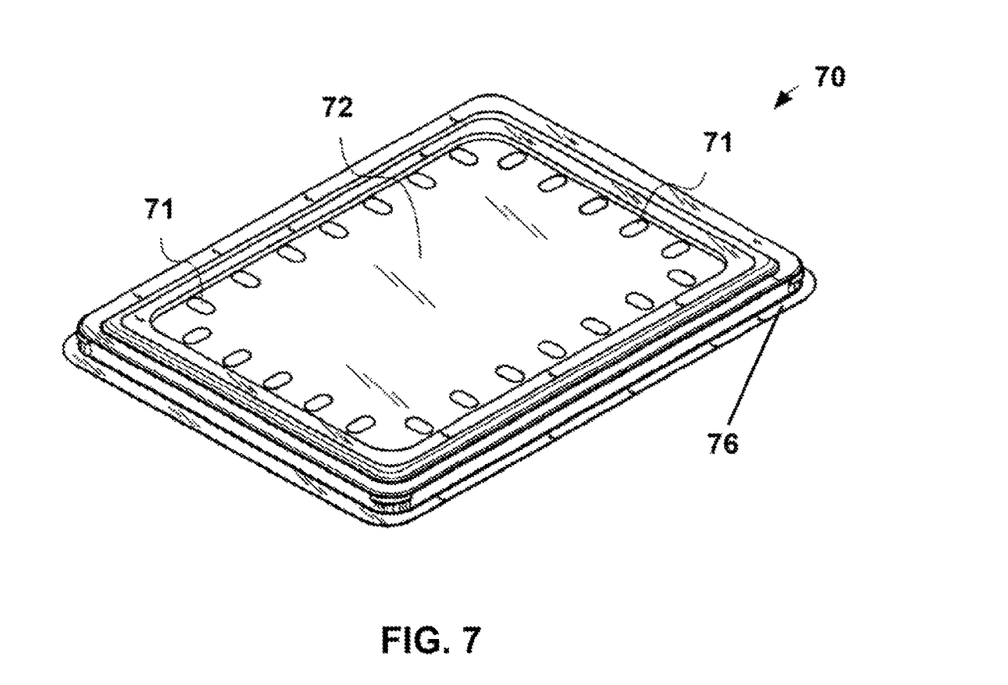
FIG. 7 is an isometric view of a lidding material thermoformed from an embodiment of a sheet according to the present application.

FIG. 7 is an isometric view of a lidding material thermoformed from an embodiment of a sheet according to the present application. Lidding material 70 comprises wall 72 and lid flange 76. Lid flange 76 defines the outer periphery of lidding material 70. As depicted in FIG. 7, lidding material 70 also comprises openings 71. In various embodiments, a lidding material (whether from a sheet according to the present application in non-formed form (as in FIG. 6), from a sheet according to the present application in formed form (as in FIG. 7), or not from a sheet according to the present application) may or may not have openings or micro perforations (or other venting features), other functional features, or ribs or other ornamentation.

Figure 8:
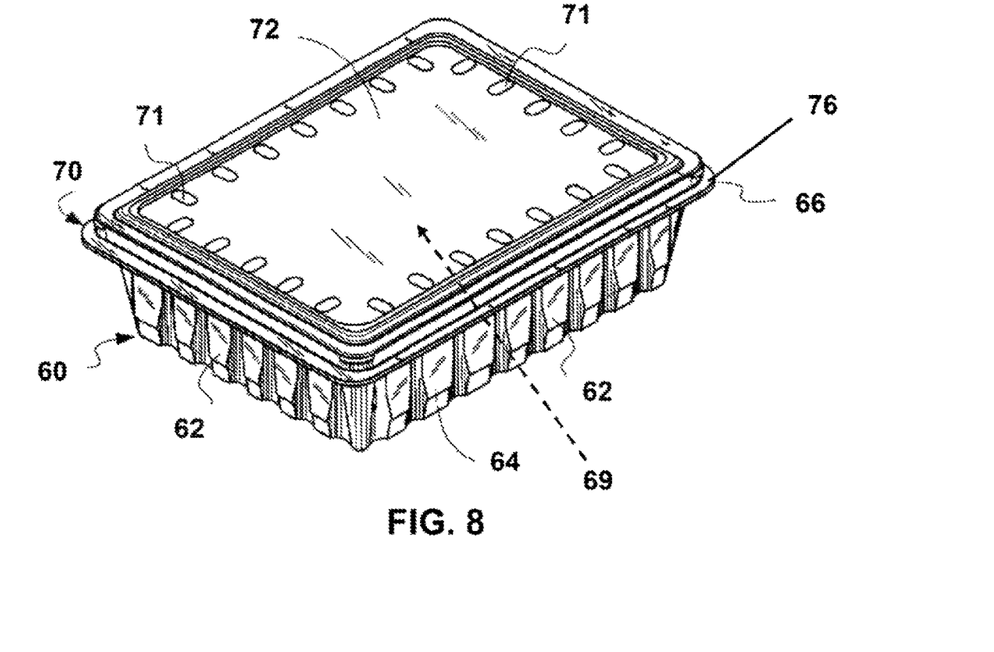
FIG. 8 is an isometric view of a tray thermoformed from an embodiment of a sheet according to the present application and a lidding material thermoformed from an embodiment of a sheet according to the present application.

In various embodiments, lidding material 70 (i.e., lidding material formed from a sheet according to the present application) may be used with another package not formed from a sheet according to the present application or may be used with another package formed from a sheet according to the present application. FIG. 8 is an isometric view of a tray thermoformed from an embodiment of a sheet according to the present application and a lidding material thermoformed from an embodiment of a sheet according to the present application. As depicted in FIG. 8, lidding material 70 (formed from a sheet according to the present application) with lid flange 76 attaches to tray 60 (formed from a sheet according to the present application) at tray flange 66 to completely enclose cavity 69 (depicted with a dashed lead line as it is hidden in the lidded tray).

Figure 9:
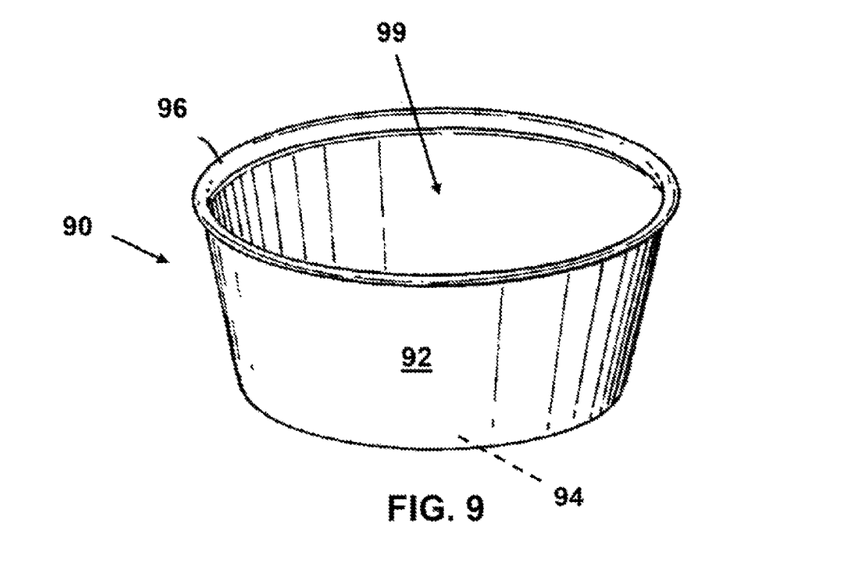
FIG. 9 is an isometric view of a cup thermoformed from an embodiment of a sheet according to the present application.

FIG. 9 is an isometric view of a cup thermoformed from an embodiment of a sheet according to the present application. Cup 90 comprises circular side wall 92, base wall 94 (depicted with a dashed lead line as it is hidden by side wall 92), cup flange 96, and cavity 99. In various embodiments, cavity 99 of cup 90 may be completely or partially enclosed with a lidding material from a sheet according to the present application (whether formed or not formed) or with a lidding material not from a sheet according to the present application. As such, in whatever form, lidding material is adapted to attach to cup flange 96.

The various embodiments of the sheet or the package described in the present application may exhibit various properties, as exemplified and further described in the Examples below.

In some embodiments, the sheet or the package may have a thickness of from 10 mil to 50 mil or from 20 mil to 40 mil or from 20 mil to 30 mil.

In some embodiments, as further described in the Examples below, the sheet may have a free shrink at 100° C. in each of the machine direction and the transverse direction of less than 1.0%. As used throughout this application, the term "machine direction" or "MD" refers to the direction of sheet transport during or after extrusion or film conversion. As used throughout this application, the term "transverse direction" or "TD" refers to the direction perpendicular to the machine direction In various embodiments, the sheet or the package is thermally stable, i.e., it maintains dimensionality and shape and does not substantially distort or deform after exposure to temperatures up to 112° C. As described above, as a thermally stable article, in various embodiments, the sheet or the package does not substantially deform when hot fill materials having temperatures of 68° C. to 80° C. or 71° C. to 110° C. or up to 112° C. are placed in or on the article; and, it does not substantially deform when placed in boiling water at 100° C. or subjected to steam sterilization or to microwave heating or to other heating during which the contents of the package (including but not limited to steam) reach temperatures up to 112° C.

In some embodiments, the sheet or the package may have various clarity properties. As used throughout this application, the term "clarity" refers to the see-through quality of a material. It refers to the specific light transmitting and narrow-angle-light scattering properties of a material and is determined in an angle range less than 2.5 degrees. Clarity may be determined in accordance with ASTM D1003-13 ("Standard Test Method for Haze and Luminous Transmittance of Transparent Plastics"). Clarity values are reported in percent. A high clarity value generally reflects a material that is less cloudy and more transparent to visible wavelengths.

The sheet or the package may have a clarity of greater than 99% or a clarity of from 98% to 99.9% before, during, or after exposure to temperatures up to 112° C. The sheet or the package described in the present application may have a clarity after exposure to temperatures up to 112° C. that is substantially similar to a clarity before exposure to temperatures up to 112° C.

In some embodiments, the sheet or the package may have various haze properties. As used throughout this application, the term "haze" refers to the scattering of light as it passes through a material, it refers to the specific light-transmitting and wide-angle-light scattering properties of planar sections of a material. Haze may be determined in accordance with ASTM D1003-13 ("Standard Test Method for Haze and Luminous Transmittance of Transparent Plastics"). Haze values are reported in percent. A high haze value generally reflects a material that is more cloudy and less transparent to visible wavelengths.

The sheet or the package may have a haze less than 1.5% before exposure to temperatures up to 112° C. and a haze less than or equal to 20% after five minutes of exposure to temperatures up to 112° C. As further described in the Examples below, this is in contrast to a sheet comprising the first copolyester but not comprising the second copolyester (i.e., a copolyester having a glass transition temperature of equal to or greater than 112° C.); such comparative sheet may have a haze of greater than 4% before exposure to temperatures up to 112° C. and greater than 40% after five minutes of exposure to temperatures up to 112° C. The sheet or the package described in the present application may have a haze after exposure to temperatures up to 112° C. that is substantially less than a haze after exposure to temperatures up to 112° C. over a similar time period of another sheet having a similar thickness and comprising the first copolyester but not comprising the second copolyester.

In some embodiments, the sheet or the package may have various tensile properties after exposure to temperatures up to 112° C. These tensile properties include stress at yield, stress at break, and elongation at break. As used throughout this application, the term "stress at yield" refers to the tensile stress at which the rise in the stress-strain curve initially equals zero; it also refers to the tensile stress at the initial yield point, i.e., the point at which the sheet experiences initial plastic deformation (in contrast to elastic deformation such as rupture, tear, or break). Stress at yield is often expressed in force per unit area, e.g., psi. As used throughout this application, the term "stress at break" refers to the tensile stress at which a sheet ruptures, tears, or breaks, either partially or fully. Stress at break is often expressed in force per unit area, e.g., psi. As used throughout this application, the term "elongation at break" refers to the extension (i.e. lengthening or stretching) of a sheet produced by the tensile stress at the moment of partial or full rupture, tear, or break. Elongation at break is often expressed as a percentage of the original length of the specimen.

The sheet or the package may have a stress at yield after exposure to temperatures up to 112° C. of greater than 1000 psi or greater than 1150 psi or from 1000 psi to 2000 psi. As further described in the Examples below, this is in contrast to a sheet comprising the first copolyester but not comprising the second copolyester; such comparative sheet may have a have a stress at yield after exposure to temperatures up to 112° C. of less than 300 psi. The sheet or the package described in the present application requires almost five times the force to create initial plastic deformation. The sheet or the package described in the present application has a stress at yield after exposure to temperatures up to 112° C. that is substantially greater than a stress at yield after exposure to temperatures up to 112° C. of another sheet having a similar thickness and comprising the first copolyester but not comprising the second copolyester.

The sheet or the package may have a stress at break after exposure to temperatures up to 112° C. that is comparable to the stress at break of a sheet comprising the first copolyester but not comprising the second copolyester, assuming such comparative sheet actually breaks. Such stress at break may be greater than 1000 psi or greater than 1400 psi or from 1000 psi to 2000 psi.

The sheet or the package may have an elongation at break after exposure to temperatures up to 112° C. of less than 400%. As further described in the Examples below, this is in contrast to a sheet comprising the first copolyester but not comprising the second copolyester (i.e., a copolyester having a glass transition temperature of equal to or greater than 112° C.); such comparative sheet may have an elongation at break after exposure to temperatures up to 112° C. of greater than 1100%. As such, the sheet or the package described in the present application does not elongate substantially after exposure to temperature up 112° C. before breaking in contrast to a sheet comprising the first copolyester but not comprising the second copolyester.

The sheet and the package (such as the various trays) described in the present application with the various properties described above may be adapted to package both non-food and food product. Non-limiting examples of non-food products include pet foods, medications (including but not limited to cough syrup), personal care items (including but not limited to massage oils or soothing rubs), etc. Non-limiting examples of food products include produce (including but not limited to respiring produce, fruits, and vegetables such as potatoes, broccoli, carrots, beans, corn, peas, and blends of such), baked goods, ready meals, frozen snacks, frozen meals, condiments, syrups, dips (including but not limited to fruit-based (e.g., apple) and dairy-based (e.g., cheese) dips), beverages, etc.

Accordingly, another embodiment of the present application comprises e hod of cooking produce using a tray comprising the sheet as described in the present application. This method comprises providing a tray comprising such thermoformed sheet, filling the tray with produce in a method known to a person of ordinary skill in the packaging arts, and heating the filled tray in a microwave oven. As such tray is formed from an embodiment of the sheet described in the present application, the tray is thermally stable after exposure to microwave heating.

EXAMPLES

To further exemplify the various embodiments of the present application, several example and comparative example sheets were produced via cast coextrusion and evaluated for various properties. TABLE 1 provides information regarding the composition of the various examples and comparative examples.

TABLE 1

| | Sheet Thickness | First Layer | % Sheet Volume (layer thickness) | Second Layer | % Sheet Volume (layer thickness) | Third Layer | % Sheet Volume (layer thickness) | % Sheet Volume First Copoly-ester | Second Copoly-ester | Other Copoly-ester |
|---|---|---|---|---|---|---|---|---|---|---|
| Example 1 | 22 mil | APET1 | 37.5% (8.25 mil) | FX200 | 25% (5.5 mil) | APET1 | 37.5% (8.25 mil) | 75% | 25% | |
| Example 2 | 26 mil | APET2 | 42.5% (11.05 mil) | FX200 | 15% (3.9 mil) | APET2 | 42.5% (11.05 mil) | 85% | 15% | |
| Example 3 | 26 mil | APET2 | 40% (10.4 mil) | FX200 | 20% (5.2 mil) | APET2 | 40% (10.4 mil) | 80% | 20% | |
| Example 4 | 26 mil | APET2 | 35% (9.1 mil) | FX200 | 30% (7.8 mil) | APET2 | 35% (9.1 mil) | 70% | 30% | |
| Example 5 | 26 mil | APET2 | 32.5% (8.45 mil) | FX200 | 35% (9.1 mil) | APET2 | 32.5% (8.45 mil) | 65% | 35% | |
| Example 6 | 26 mil | APET2 | 30% (7.8 mil) | FX200 | 40% (10.4 mil) | APET2 | 30% (7.8 mil) | 60% | 40% | |
| Example 7 | 26 mil | APET2 | 27.5% | FX200 | 45% | APET2 | 27.5% | 55% | 45% | |

TABLE 1-continued

| | Sheet Thickness | First Layer | % Sheet Volume (layer thickness) | Second Layer | % Sheet Volume (layer thickness) | Third Layer | % Sheet Volume (layer thickness) | First Copolyester | Second Copolyester | Other Copolyester |
|---|---|---|---|---|---|---|---|---|---|---|
| Comparative Example 1 | 22 mil | APET1 | 100% (22 mil) | | (7.15 mil) | | (7.15 mil) | 100% | 0% | |
| Comparative Example 2 | 26 mil | APET2 | 100% (26 mil) | | | | | 100% | 0% | |
| Comparative Example 3 | 26 mil | APET2 | 45% (11.7 mil) | FX200 | 10% (2.6 mil) | APET2 | 45% (11.7 mil) | 90% | 10% | |
| Comparative Example 4 | 26 mil | APET2 | 42.5% (11.05 mil) | FX100 | 15% (3.9 mil) | APET2 | 42.5% (11.05 mil) | 85% | | 15% |
| Comparative Example 5 | 26 mil | APET2 | 35% (9.1 mil) | FX100 | 30% (7.8 mil) | APET2 | 35% (9.1 mil) | 70% | | 30% |
| Comparative Example 6 | 26 mil | APET2 | 30% (7.8 mil) | FX100 | 40% (10.4 mil) | APET2 | 30% (7.8 mil) | 60% | | 40% |

APET1 was Laser+® C (E60A), having an intrinsic viscosity of 0.81±0.02 dl/g and a glass transition temperature of from 70° C. to 90° C. and, therefore, meeting the characteristics of the first copolyester as described in this application.

APET2 was Cleartuf® 8006C, having an intrinsic viscosity of 0.80±0.02 dl/g and a glass transition temperature of from 70° C. to 90° C. and, therefore, meeting the characteristics of the first copolyester as described in this application.

FX200 was Eastman Tritan™ Copolyester FX200, having a glass transition temperature of 119° C. (DSC) and, therefore, meeting the characteristics of the second copolyester as described in this application.

FX100 was Eastman Tritan™ Copolyester FX100, having a glass transition temperature of 110° C. (DSC) and, therefore, not meeting the characteristics of either the first copolyester or the second copolyester as described in this application (and so noted in TABLE 1 as "other copolyester.")

Example 1 and Comparative Example 1 were evaluated for clarity and haze before and after exposure to temperatures up to 112° C. To evaluate, a 4 inch by 4 inch square was cut from two samples of each sheet; each replicate was then boiled (i.e., placed in boiling water) over a range of time. TABLE 2 reports the average results.

TABLE 2

| | Example 1 | | Comparative Example 1 | |
|---|---|---|---|---|
| Boil Time (min) | Clarity | Haze | Clarity | Haze |
| 0 | 99.45 | 1.22 | 99.40 | 4.19 |
| 1 | 99.60 | 2.64 | 99.05 | 14.90 |
| 2 | 99.70 | 8.10 | 99.45 | 30.95 |
| 3 | 99.45 | 9.04 | 98.50 | 45.00 |
| 4 | 99.00 | 20.00 | 98.80 | 31.65 |
| 5 | 98.60 | 15.95 | 97.55 | 36.95 |

As reported in TABLE 2, while the haze of Example 1 did increase substantially as a function of boiling time, the clarity at the longest boiling interval decreased by less than 1% relative to the clarity prior to boiling (i.e., at 0 minutes boil time). As such, Example 1 has a clarity after exposure to temperatures up to 112° C. that is substantially similar to a clarity before exposure to temperatures up to 112° C.

As also reported in TABLE 2, the clarity of Comparative Example 1 decreases at a faster rate as a function of boiling time compared to the clarity of Example 1. Additionally, the haze of Comparative Example 1 increases at a faster rate as a function of boiling time compared to the haze of Example 1. As such, Example 1 has a haze after exposure to temperatures up to 112° C. that is substantially less than the haze of Comparative Example 1 after exposure to temperatures up to 112° C. over a similar time period, with Comparative Example 1 as another sheet having a similar thickness to Example 1 and comprising the first copolyester but not comprising the second copolyester.

Example 3 was also evaluated for clarity and haze before exposure to boiling or other elevated temperatures. Example 3 was determined to have a clarity of 98.9% and a haze of 0.90%.

Example 1 and Comparative Example 1 were further evaluated via tensile testing for resistance to deformation at elevated temperatures (e.g., temperatures up to 112° C.). ASTM D882, "Standard Test Method for Tensile Properties of Thin Plastic Sheeting" was used to determine various tensile properties such as stress at yield, stress at break, and elongation at break of three samples of each of Example 1 and Comparative Example 1 at 100° C., using a 0.5 inch span and 20 inch per minute crosshead speed. TABLE 3 reports the average results.

TABLE 3

| | Measured Thickness (mil) | | Stress at Yield (psi) | | Stress at Break (psi) | | Elongation at Break (%) | |
|---|---|---|---|---|---|---|---|---|
| | MD | TD | MD | TD | MD | TD | MD | TD |
| Example 1 | 21.99 | 21.50 | 1279 | 1197 | 1646 | 1451 | 333 | 317 |
| Comparative Example 1 | 21.28 | 21.49 | 258 | 242 | NA | 1663 | 1250+ | 1148 |

The machine direction stress at break of Comparative Example 1 is reported as NA as none of the three samples of Comparative Example 1 exhibited a break, either partially or fully, in the machine direction. Accordingly, the machine direction elongation at break of Comparative Example 1 reported as 1250+%, with 1250% as the upper limit of the testing equipment.

Figure 10:
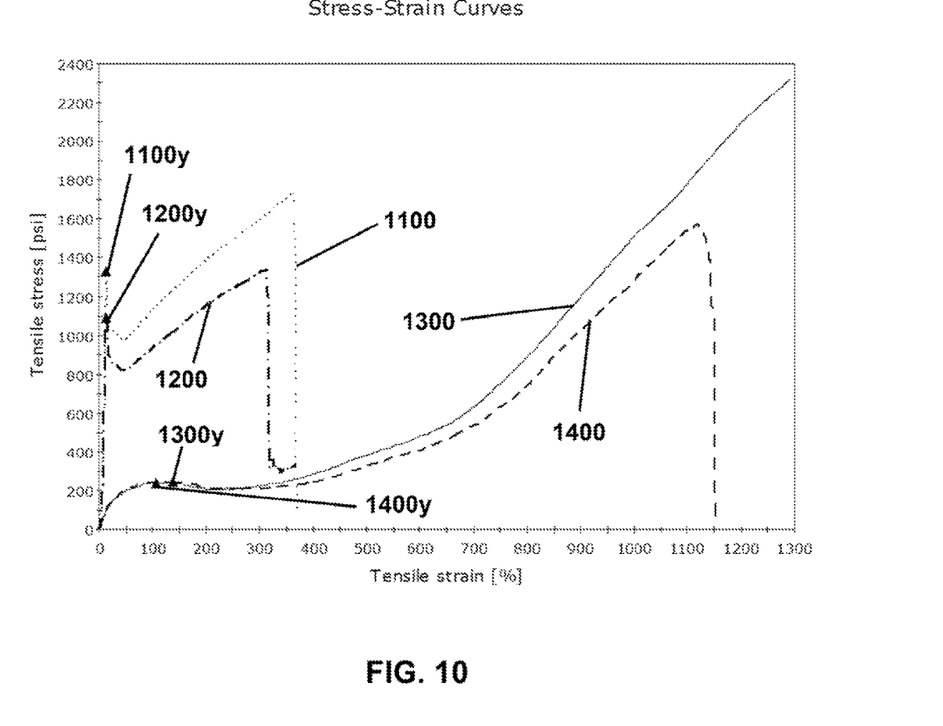
FIG. 10 is a graph showing the stress-strain curves of Example 1 and Comparative Example 1 in each of the machine direction and the transverse direction.

The data of TABLE 3 may also be depicted graphically. FIG. 10 is a graph showing the stress-strain curves of Example 1 and Comparative Example 1 in each of the machine direction and the transverse direction. Line 1100 (dotted line) represents the stress-strain curve of Example 1 in the machine direction. Line 1200 (dashed-dotted line)

represents the stress-strain curve of Example 1 in the transverse direction. Line 1300 (solid line) represents the stress-strain curve of Comparative Example 1 in the machine direction. Line 1400 (dashed line) represents the stress-strain curve of Comparative Example 1 in the transverse direction. Triangle 1100y represents stress at yield (i.e., the point of initial deformation) of Example 1 in the machine direction (1279 psi). Triangle 1200y represents the stress at yield of Example 1 in the transverse direction (1197 psi). Triangle 1300y represents the stress at yield of Comparative Example 1 in the machine direction (258 psi). Triangle 1400y represents the stress at yield of Comparative Example 1 in the machine direction (242 psi).

TABLE 3 and FIG. 10 describe the resistance of Example 1 and Comparative Example 1 to deformation when under a load at 100° C. As reported in TABLE 3 and depicted in FIG. 10, Example 1 does not elongate substantially at 100° C. in comparison to Comparative Example 1. Example 1 broke at less than 400% elongation (or, in this instance, less than two inches of extension) in each of the machine direction and the transverse direction, while Comparative Example 1 never broke in the machine direction and broke at greater than 1100% elongation (or, in this instance, greater than five inches of extension) in the transverse direction. Additionally, Example 1 requires a greater tensile stress to reach the point of initial deformation at a temperature of 100° C. than Comparative Example 1, almost five times the tensile stress. As such, Example 1 has a stress at yield after exposure to temperatures up to 112° C. that is substantially greater than the stress at yield of Comparative Example 1 (i.e., another sheet having a similar thickness to Example 1 and comprising the first copolyester but not comprising the second copolyester).

Example 1 and Comparative Example 1 were also evaluated for heat shrinkage values. As used throughout this application, the term "shrinkage value" refers to values obtained by measuring unrestrained (or free) shrink of a ten-centimeter square sample immersed in water at 100° C. for five seconds. For the present application, three test specimens were cut from each of Example 1 and Comparative Example 1. The specimens were cut into squares of ten-centimeter length in the machine direction by ten-centimeter length in the transverse direction. Each specimen was completely immersed for five seconds in a 100° C. water bath. Each specimen was then removed from the bath and the distance between the ends of each shrunken specimen was measured for both the machine and transverse directions. The difference in the measured distance for the shrunken specimen and the original ten-centimeter side was multiplied by ten to obtain the percent of shrinkage for the specimen n each direction. TABLE 4 reports the average free shrink values of the three specimens of each of Example 1 and Comparative Example 1 in each of the machine direction and the transverse direction.

TABLE 4

| Free Shrink, % | | | |
|---|---|---|---|
| Example 1 | | Comparative Example 1 | |
| MD | TD | MD | TD |
| 0.3 | 0.7 | 2.0 | 1.0 |

To further exemplify the various embodiments of the present application, Example 2, Example 3, Comparative Example 2, and Comparative Example 3 were thermoformed with a tray mold having a 1.5 inch draw depth to form a tray similar to the tray of FIG. 6. Each tray was 75% (by volume) filled with water and cooked in a microwave oven to hold boiling water for 3 minutes (for 4-minute total cook time). TABLE 5 reports the results of the visual evaluation of the cooked samples.

TABLE 5

| | Visual Evaluation |
|---|---|
| Example 2 | Slight, barely detectable deformation on a side wall |
| Example 3 | No visible deformation of any kind |
| Comparative Example 2 | Visibly melted |
| | Lost almost half of its depth |
| Comparative Example 3 | Visible moderate deformation on bottom and side walls |

The slight, barely detectable deformation of Example 2 was acceptable in and of itself and is assumed to disappear completely in the absence of any additional stress (e.g., the weight of the water) compared to the minimal stress of its own weight as, for example, a lidding material.

Examples 4-7 and Comparative Examples 4-6 were thermoformed with a cup mold (cf., a fruit cup mold) to form a cup similar to the cup of FIG. 9. Each cup was 75% filled (by volume) with water and cooked in a microwave oven to hold boiling water for 3 minutes (for a 4-minute total cook time). TABLE 6 reports the results of the visual evaluation of the cooked samples.

TABLE 6

| | Visual Evaluation |
|---|---|
| Example 4 | No physical deformation |
| | Looked identical to pre-cooked part except for slight blue haze on bottom |
| Example 5 | No physical deformation |
| | Looked identical to pre-cooked part except for slight blue haze on bottom |
| Example 6 | No physical deformation |
| | Looked identical to pre-cooked part except for slight blue haze on bottom |
| Example 7 | No physical deformation |
| | Looked identical to pre-cooked part except for slight blue haze on bottom |
| Comparative Example 4 | Physical deformation on bottom and side walls |
| Comparative Example 5 | Physical deformation on bottom and side walls |
| Comparative Example 6 | No physical deformation |

The slight blue haze of cooked Examples 4-7 was deemed acceptable for end-user purposes. Further, while cooked Comparative Example 6 showed no physical deformation, as described above Comparative Example 6 includes a "first copolyester" but does not include a "second copolyester" as described in the present application. Additionally, the required 40% by volume loading of the "other copolyester" in Comparative Example 6 to achieve no physical deformation does not provide desired flexibility in manufacturing processes or costs.

Each and every document cited in this present application, including any cross-referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being preceded in all instances by the term "about". Accordingly, unless expressly indicated to the contrary, the numerical parameters set forth in the present application (including the appended claims) are approximations that can vary depending on the desired properties sought to be obtained by a person of ordinary skill in the packaging arts without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including "and/or," unless the context clearly dictates otherwise.

Spatially related terms, including but not limited to, "lower," "upper," "beneath," "below," "above," "bottom," and "top," if used in the present application (including the appending claims), are used for ease of description to describe spatial relationships of element(s) to another. Such spatially related terms encompass different orientations of the package in use or operation, in addition to the particular orientations depicted in the drawings and described in the present application (including the appended claims). For example, if an object depicted in the drawings is turned over or flipped over or inverted, elements previously described as below or beneath other elements would then be above those other elements.

The description, examples, embodiments, and drawings disclosed are illustrative only and should not be interpreted as limiting. The present invention includes the description, examples, embodiments, and drawings disclosed; but it is not limited to such description, examples, embodiments, or drawings. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A sheet comprising
   a first layer comprising a first copolyester having a glass transition temperature of from 70° C. to 90° C. and an intrinsic viscosity of from 0.70 dl/g to 0.90 dl/g, wherein the first copolyester comprises from 50% to 85% by volume of the sheet;
   a second layer comprising a second copolyester having a glass transition temperature of equal to or greater than 112° C., wherein the second copolyester comprises from 15% to 50% by volume of the sheet;
   wherein the sheet is thermally stable after exposure to temperatures up to 112° C.

2. The sheet of claim 1 wherein the first copolyester comprises APET.

3. The sheet of claim 1 wherein the second copolyester has a glass transition temperature of from 112° C. to 250° C.

4. The sheet of claim 1 wherein the first copolyester comprises from 50% to 85% by volume of the sheet and the second copolyester comprises from 15% to 40% by volume of the sheet.

5. The sheet of claim 1 wherein the first copolyester comprises from 70% to 85% by volume of the sheet and the second copolyester comprises from 15% to 30% by volume of the sheet.

6. The sheet of claim 1 wherein the sheet has a clarity after exposure to temperatures up to 112° C. that is substantially similar to a clarity before exposure to temperatures up to 112° C.

7. The sheet of claim 1 wherein the sheet has a haze after exposure to temperatures up to 112° C. that is substantially less than a haze after exposure to temperatures up to 112° C. over a similar time period of another sheet having a similar thickness and comprising the first copolyester but not comprising the second copolyester.

8. The sheet of claim 1 wherein the sheet has a stress at yield after exposure to temperatures up to 112° C. that is substantially greater than a stress at yield after exposure to temperatures up to 112° C. of another sheet having a similar thickness and comprising the first copolyester but not comprising the second copolyester.

9. The sheet of claim 1 wherein the sheet has a thickness of from 10 mil to 50 mil.

10. The sheet of claim 1 wherein the sheet is thermoformable.

11. The sheet of claim 1 wherein the sheet is thermoformed into a package.

12. The sheet of claim 1 wherein the sheet further comprises a third layer comprising the first copolyester and the second layer is positioned between the first layer and the third layer.

13. The sheet of claim 12 wherein the first layer and the third layer have a substantially similar thickness.

14. A tray comprising a thermoformed sheet comprising
   a first layer comprising a first copolyester having a glass transition temperature of from 70° C. to 90° C. and an intrinsic viscosity of from 0.70 dl/g to 0.90 dl/g, wherein the first copolyester comprises from 70% to 85% by volume of the sheet;
   a second layer comprising a second copolyester having a glass transition temperature of from 112° C. to 250° C., wherein the second copolyester comprises from 15% to 30% by volume of the sheet;
   a third layer comprising the first copolyester, wherein the second layer is positioned between the first layer and the third layer;
   wherein the first layer and the third layer have a substantially similar thickness; and
   wherein the sheet is thermally stable after exposure to temperatures up to 112° C.

15. The tray of claim 14 wherein the sheet has a thickness of from 20 mil to 40 mil.

16. The tray of claim 14 wherein the sheet has a haze after exposure to temperatures up to 112° C. that is substantially less than a haze after exposure to temperatures up to 112° C. over a similar time period of another sheet having a similar thickness and comprising the first copolyester but not comprising the second copolyester.

17. The tray of claim 14 wherein the tray is adapted to package a food product.

18. The tray of claim 17 wherein the food product comprises produce.

19. A method of cooking produce comprising
providing a tray comprising a thermoformed sheet comprising (a) a first layer comprising a first copolyester having a glass transition temperature of from 70° C. to 90° C. and an intrinsic viscosity of from 0.70 dl/g to 0.90 dl/g, wherein the first copolyester comprises from 70% to 85% by volume of the sheet, (b) a second layer comprising a second copolyester having a glass transition temperature of equal to or greater than 112° C., wherein the second copolyester comprises from 15% to 30% by volume of the sheet, and (c) a third layer comprising the first copolyester, wherein the second layer is positioned between the first layer and the third layer and the first layer and the third layer have a substantially similar thickness;
filling the tray with produce; and
heating the filled tray in a microwave oven;
wherein the tray is thermally stable after exposure to microwave heating.

20. The method of claim 19 wherein the sheet has a haze after exposure to microwave heating that is substantially less than a haze after exposure to microwave heating over a similar time period of another sheet having a similar thickness and comprising the first copolyester but not comprising the second copolyester.

* * * * *

UNITED STATES PATENT AND TRADEMARK OFFICE
CERTIFICATE OF CORRECTION

Page 1 of 2

PATENT NO. : 10,384,854 B2
APPLICATION NO. : 15/635606
DATED : August 20, 2019
INVENTOR(S) : Corey A. Wollaeger and Ryan M. Wilks It is certified that error appears in the above-identified patent and that said Letters Patent is hereby corrected as shown below:

In the Specification

In Column 1, Line 18, delete "oven, in" and insert -- oven. In --, therefor.

In Column 1, Line 30, delete "material's" and insert -- materials --, therefor.

In Column 3, Line 02, delete "0.90 dl/g" and insert -- 0.90 dl/g, --, therefor.

In Column 4, Line 12, delete "dials" and insert -- diols --, therefor.

In Column 4, Line 16, delete "dials" and insert -- diols --, therefor.

In Column 4, Line 20, delete "dials" and insert -- diols --, therefor.

In Column 4, Line 22, delete "2,2,4,4-tetramethyl-1,3-cyclobutanedial" and insert -- 2,2,4,4-tetramethyl-1,3- cyclobutanediol --, therefor.

In Column 5, Line 32, after "density of" delete "density of".

In Column 5, Line 41, delete "sheet," and insert -- sheet; --, therefor.

In Column 5, Line 57, after "(i.e.," insert -- % --.

In Column 10, Line 48, delete "material, it" and insert -- material. It --, therefor.

In Column 11, Line 32, after "have a" delete "have a".

In Column 12, Line 30, delete "e hod" and insert -- a method --, therefor.

In Column 15, Line 51, after "specimen" delete "n" and insert -- in --, thereof.

Signed and Sealed this
Fifth Day of October, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,384,854 B2

In the Claims

In Column 18, Line 04, in Claim 4, delete "50 %" and insert -- 60% --, therefor.